G. V. BARNES.
SEAT FOR VEHICLES OR THE LIKE.
APPLICATION FILED MAR. 9, 1920.
1,379,076.   Patented May 24, 1921.
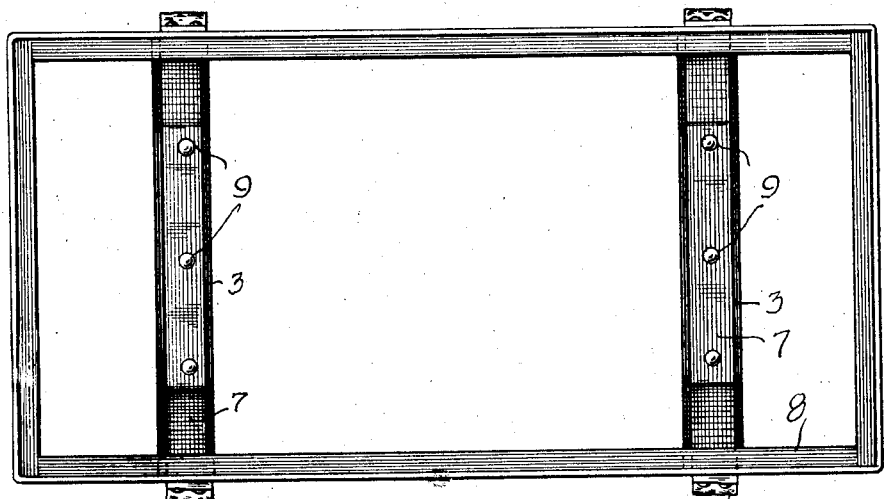
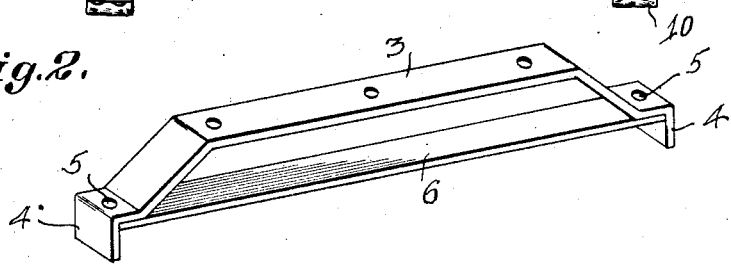
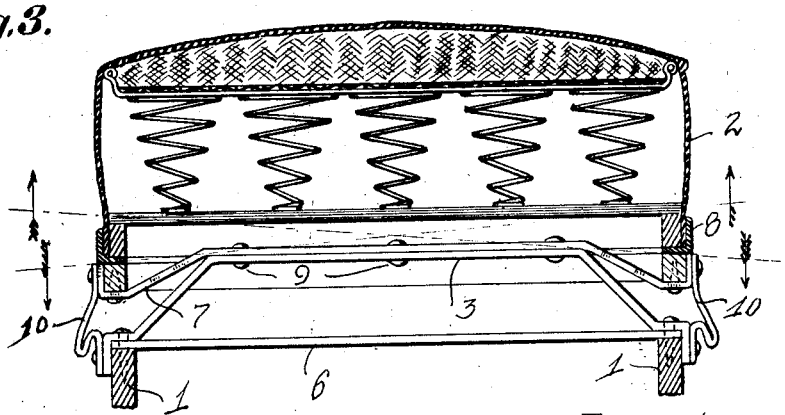
Witness.
Inventor.
Gaylord V. Barnes
By
Attorneys

UNITED STATES PATENT OFFICE.

GAYLORD V. BARNES, OF ALAMEDA, CALIFORNIA.

SEAT FOR VEHICLES OR THE LIKE.

1,379,076.   Specification of Letters Patent.   Patented May 24, 1921.

Application filed March 9, 1920. Serial No. 364,418.

*To all whom it may concern:*

Be it known that I, GAYLORD V. BARNES, a citizen of the United States, residing at No. 985 Park street, Alameda, in the county of Alameda and State of California, have invented a new and useful Seat for Vehicles or the like, of which the following is a specification.

This invention relates to seats for vehicles or the like conveyances and has reference more particularly to a seat mounting or suspension.

The primary object of the invention is to provide means for absorbing, so to speak, lateral jolts and shocks experienced in a vehicle such as an automobile which are not taken up or absorbed by the springs of the vehicles.

As heretofore practised, in seat construction for motor vehicles, the upholstered part of the cushion is usually provided with shock absorbing springs which working together with the springs of the vehicle body, tend to relieve the occupants of vertical jolts and shocks experienced when the vehicle traverses a more or less rough road surface, but these spring devices are not adequate to absorb the so-called lateral or horizontal shocks or jars which are caused by irregularities in the road surface as well as sudden stopping or starting of the vehicle and ordinary conditions present in the running of the vehicle.

With the present invention, these lateral or horizontal shocks or jolts are relieved and the persons occupying the seats equipped with this invention will not experience the discomforts noticed when the ordinary seat construction is used.

The accompanying drawing illustrates a preferred embodiment of the invention in which—

Figure 1 is a plan view of the frame which is adapted to receive the upholstered cushion and showing the manner of mounting or supporting the same by the strap suspension;

Fig. 2 is a perspective view of one of the bridge pieces for the strap suspension;

Fig. 3 is a sectional view through an upholstered cushion showing the preferred form of mounting the same on the improved suspending or mounting structure.

Referring now to the drawings in detail, 1 represents the frame of the box over which cushion 2 is to be mounted by means of the arrangement proposed by the invention.

According to the preferred form, it is proposed to provide a pair of arched bridge pieces 3 which are supported over the box upon the frame members 1 in spaced relation. These bridge pieces may be constructed of wood but as shown metal has been used and in this connection each of them are arranged with downwardly projecting ends 4 having openings 5 made to receive screws, bolts, or the like to secure the same on the frame 1, and also to secure the ends 4 together by means of the string piece 6, the whole assembly constituting in effect, a bow-string girder or bridge.

Overlying and extending beyond the arch of each of the bridge pieces 3 is a strap 7 the respective ends of which being connected to the frame 8 along opposite sides thereof. The bridge pieces 3 will rest on the frame longitudinally of the vehicle body, that is, extending fore and aft in direction of the length of the vehicle body, and when cushion 2 is received by the frame 8 the same will be suspended or supported by means of the straps 7 so that it is capable of oscillating or rather a fore and aft tilting or rocking movement. It is of course understood that the arches of bridge pieces 3 are shorter than the width of the frame 1 to permit this oscillating or rocking movement of the seat through means of the straps.

The straps 7 are secured across and to the arches of bridge pieces by rivets or the like 9 and in order to restrict or limit the rocking or oscillating movement of the seat, straps or the like 10 are connected to the frame 8 and to the frame 1 so that the frame 8 which carries the cushion may be anchored should it have a tendency to tilt too far in either a forward or rearward direction.

I could of course construct the bridge pieces of wooden blocks and obtain the same results. In fact, various changes may be made in the construction without departing from the spirit of the invention, In this connection, I would consider the existing novelty to broadly reside in the cushion or seat which is supported or mounted with freedom to tilt in a forward, rearward or sidewise direction.

I claim:

In a seat construction for vehicles, a supporting frame disposed transversely of the vehicle body, and means for mounting the seat on said frame whereby it may absorb and overcome horizontal shocks, said means including a plurality of transversely spaced apart arched members supported at their front and rear ends on said frame, and flexible straps secured upon and extending beyond the arched portions of said members and secured at their free ends to the bottom of the seat at its front and rear.

GAYLORD V. BARNES.